(12) United States Patent
Gearhart

(10) Patent No.: US 6,386,797 B1
(45) Date of Patent: May 14, 2002

(54) CONDUIT LINER CUTTER

(76) Inventor: Stephen V. Gearhart, 515 5th St., P.O. Box 398, Hudson, IA (US) 50643

( * ) Notice: Subject to any disclaimer, the term of this patent is extended or adjusted under 35 U.S.C. 154(b) by 0 days.

(21) Appl. No.: 09/681,161

(22) Filed: Feb. 2, 2001

(51) Int. Cl.[7] .......................... F16L 55/18; B23K 37/02
(52) U.S. Cl. ............................. 405/184.3; 405/184.1; 166/55.7
(58) Field of Search ............................. 166/55.7, 55.8; 175/49, 67; 405/184.1, 184.2, 184.3, 184

(56) References Cited

U.S. PATENT DOCUMENTS

| | | | |
|---|---|---|---|
| 4,197,908 A | | 4/1980 | Davis et al. |
| 4,442,891 A | | 4/1984 | Wood |
| 4,577,388 A | | 3/1986 | Wood |
| 4,630,676 A | | 12/1986 | Long, Jr. |
| 4,819,721 A | * | 4/1989 | Long, Jr. .................. 166/55.7 |
| 4,986,314 A | * | 1/1991 | Himmler .................. 166/55.7 |
| 5,197,540 A | * | 3/1993 | Yagi et al. ................ 166/55.8 |
| 5,203,646 A | * | 4/1993 | Landsberger et al. .... 405/184.1 |
| 5,318,395 A | * | 6/1994 | Driver ...................... 166/55.8 |
| 5,368,423 A | * | 11/1994 | Hanna ...................... 166/55.7 |
| 5,664,912 A | * | 9/1997 | Csillag ..................... 405/184.1 |
| 5,960,882 A | * | 10/1999 | Polivka .................... 166/55.7 |

OTHER PUBLICATIONS

The Bowman Tool Company—"615 Remote Cutter" brochure (Undated).

* cited by examiner

*Primary Examiner*—Heather Shackelford
*Assistant Examiner*—Frederick L. Lagman
(74) *Attorney, Agent, or Firm*—James C. Nemmers

(57) ABSTRACT

The present invention is an improved cutting device and method for cutting openings in rehabilitative sewer pipe liners and other surfaces in confined spaces. The present invention utilizes a stream of ultra-high pressured fluid as a cutting medium to reduce mechanical vibration, reduce the need for the withdrawal of equipment from a confined space for repair or bit replacement, and provide a cleaning medium that allows the cleaning of remote sensing equipment at the remote location without the need for withdrawal of the equipment. The device of the present invention is a generally cylindrical or oblong body and sled having a cutting head extendible therefrom for positioning and aiming a cutting stream of ultra-high pressured fluid towards a surface to be cut.

19 Claims, 2 Drawing Sheets

CONDUIT LINER CUTTER

BACKGROUND OF INVENTION

The present invention relates generally to the field of conduit liners and specifically to an apparatus and method for cutting service, or lateral, line openings in rehabilitative conduit liners using ultra-high pressured fluid. Of course, the technology of the present invention may be applied beyond this immediate setting in any application that demands cutting in confined areas and remote control and/or observation of such cutting.

The technology of rehabilitative conduit or pipe lining is well known in the prior art and in practice. Through relining, sewer lines may be rehabilitated without the need for expensive and labor-intensive subterranean digging, trench support installation, and the accompanying risk to workers. Relining is accomplished by inserting an uncured and typically "cuffed" pipe liner into a length of existing sewer pipe, everting the cuffed liner through application of mechanical, hydraulic, or other force, and allowing the liner, or a coating on the liner, to cure in place. Typical liners may be made of a felt or other carrier medium that is impregnated with uncured resin. Other liners may be folded or flattened PVC or polyethylene pipe that is reformed in situ through the application of pressure or heat or other extrusion means. In this manner, the inserted liner becomes a rigid and continuous pipe-within-a-pipe. Because the new lining is continuous, openings must be cut in the liner shortly after installation to return sewer service to existing homes or facilities whose service line connections are covered by the newly installed liner.

The known technology for returning service to existing service lines employs a remotely controlled sled which may be driven or pulled through a lined pipe and which includes a cutting arm. The cutting arm is longitudinally retractable from a typically cylindrical body and has on its end a rotary cutting blade or bit that may be used to cut through the liner at the points of service main connections.

Because service must quickly be returned to the sealed service line openings to prevent the back-up of sewage or waste through private service connections, the cutting often must occur before the recently installed liner is completely cured. The uncured liner, when exposed to the violence of the cutting process, showers uncured resin about the area of cutting. This uncured resin, along with other debris, may pollute remote sensing equipment. In particular, the resin and debris coats remote sensing equipment such as video camera lenses or other sensors (used to locate the points of service main connections, and to monitor the cutting process) and the surface of lights used to illuminate the cutting scene. Because the resin may become impossible or unduly burdensome to remove without causing damage to the sensors (if allowed to cure after arriving on a lens or sensor), workers must frequently withdraw the sensors from the confined space to a location, such as a manhole, where they may clear the sensor of resin and dirt manually or by other means. Then, workers must relocate the lateral service connection and continue the cutting operation. The process of repeated withdrawal, cleaning, and relocation dramatically increases the time and labor costs associated with pipe rehabilitation.

In addition to lost time due to the cleaning that is required in association with the use of a mechanical cutter, the mechanical cutters themselves demand frequent replacement or repair as the cutting bits become dull through use. Further, the mechanical cutters may contact original sewer lines and cause damage to the line or to the cutter blade.

A "polishing" step is often required after a hole is cut with a mechanical cutter because the mechanical cutting element typically leaves rough edges in the pipe liner at the points of cutting. The polishing step entails withdrawing the sled, replacing the cutting bit with a sander, wire brush, or other smoothing element, relocating the openings, and smoothing out the rough edges. Whether through the cutting or the polishing step, the action of the bit upon the surface of the liner causes tremendous vibration of the cutter head, arm and sled. This vibration necessarily causes damage to even the most durable cutters, and cutter repair, rebuild and general "tune ups" are often necessary. Such repair or rebuilding may be necessary as frequently as every day of use. Therefore, the need for a separate polishing step in addition to the need for frequent repair of vibration-induced cutter damage further increases labor expense and lost opportunity.

In addition, all delays in the process increase the time during which service lines may be obstructed. There is therefore a need for a service line opening apparatus and method to eliminate or decrease downtime, decrease equipment maintenance and part replacement, decrease sewer wall damage, and decrease the overall time required to effect relining.

Examples of prior art rehabilitative pipe lining systems and liner cutters may be found in U.S. Pat. Nos. 4,197,908; 4,442,891; 4,577,388; and 4,630,676. In addition, prior art mechanical cutting systems have been manufactured by the Bowman Tool Co. of East Berlin, Pa. The '908 patent issued Apr. 15, 1980 to Davis, et al., discloses a sled or carriage type cutting apparatus having a pneumatically driven mechanical cutting bit or blade and a television camera mounted on the carriage. The '981 patent issued Apr. 17, 1984 to Wood, discloses a similar cutting device wherein the cutting element is maintained at a desired angle of intersection with the curved cutting surface through orbital motion or through a parallelogram-type linkage. The '388 patent, issued Mar. 25, 1986 to Wood, discloses a method for the use of a computer to pre-program the contour of the wall to be cut for automatic control of the mechanical cutting element to maintain a desired angle of contact between the bit and the liner. Finally, the '676 patent discloses a similar cutting apparatus wherein a mechanical cutting element is driven and manipulated axially, radially, and rotationally through the application of pressurized hydraulic fluid.

SUMMARY OF INVENTION

The present invention is a service line opener that uses "intensified" or "ultra-high-pressured" fluid, preferably water, as the cutting element. In addition to minimizing or eliminating the need for frequent withdrawal and replacement of damaged cutting blades, or potential damage to original sewer lines, the intensified water accomplishes a cut that is much smoother relative to the cut performed by the mechanical cutting bit. Therefore, the need for withdrawal to refit a polisher to the cutting head is eliminated. Further the fluid may be diverted in a more diffuse stream to a secondary function of setnsor, camera, or light-source cleaning. Alternatively, a source of water or fluid that is not intensified may be used to accomplish the secondary cleaning function. By combining the functions of liner cutting, finishing, and cleaning into the confined space operations rather than demanding individual steps separated by sled withdrawal and relocation, the time required to open a given length of liner and a given number of service lines is dramatically decreased. Further, the use of intensified water necessarily minimizes the vibration previously induced through mechanical means. Therefore, the need for withdrawal to repair the cutter and the ritualistic post-use rebuilding of the cutter is minimized. This decrease in time may dramatically decrease labor expenses and free equipment for use on a greater number of projects. Preferably, the present invention is practiced with a sled and monitor configuration. However, it will be understood by those skilled in the art that such a support/delivery system is merely an exemplary embodiment and that the benefits and functions of the present invention may extend to a plurality of other configurations.

DETAILED DESCRIPTION

Figure 1:
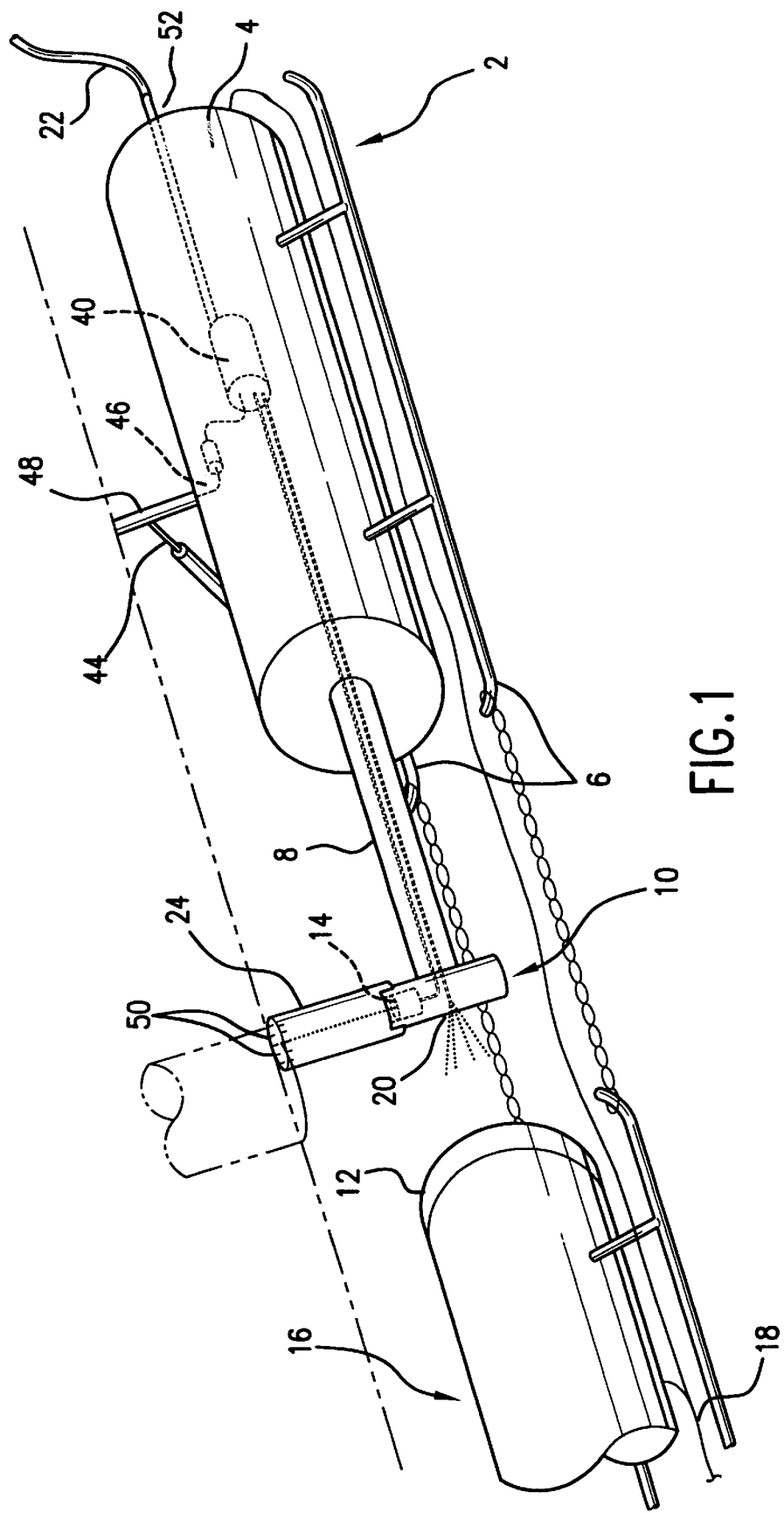
FIG. 1 reflects a perspective view of a sled, cutting arm, and camera sled in relation to a service line opening.
Figure 2:
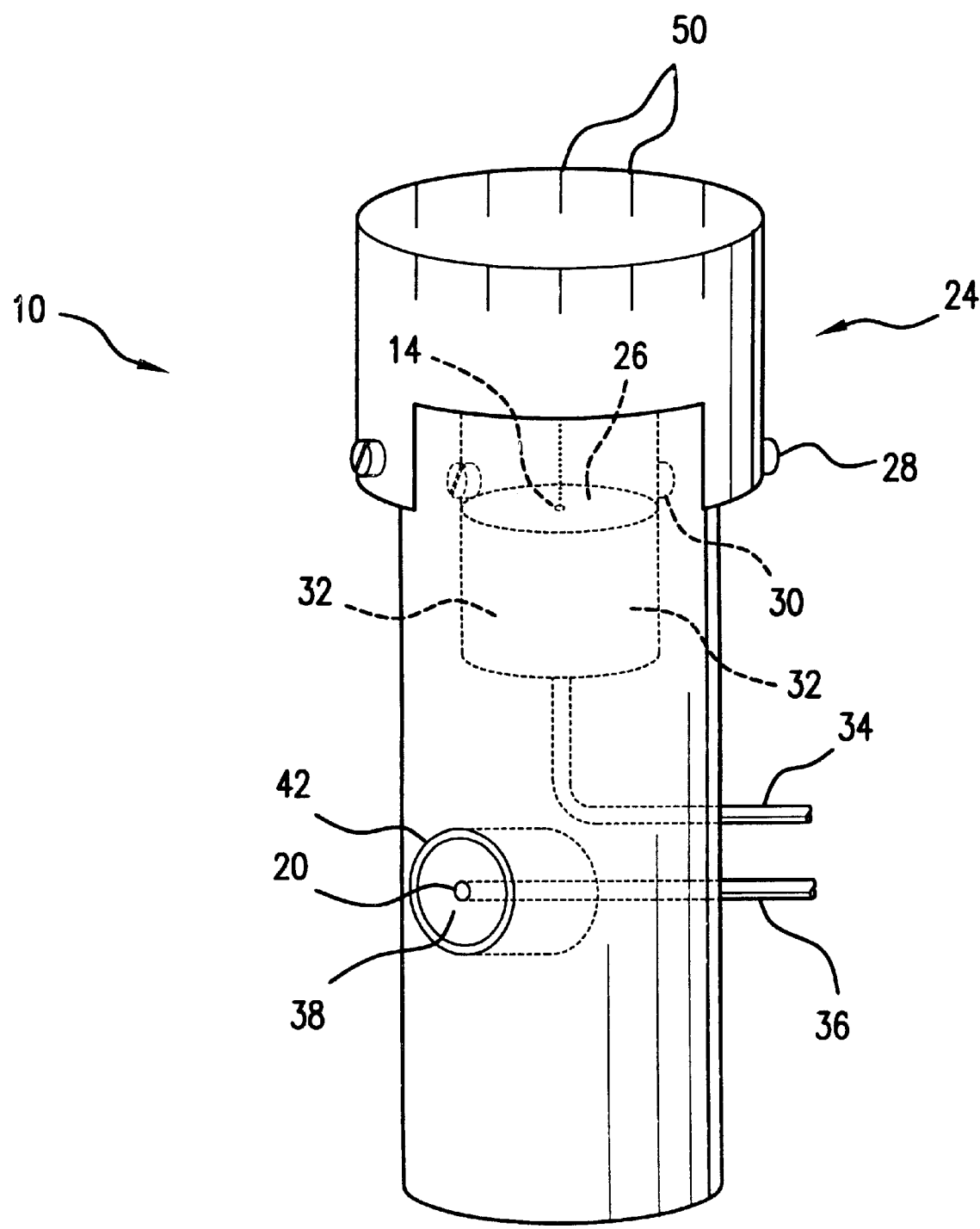
FIG. 2 reflects a perspective view of the laser pencil.

FIG. 1 discloses a pipe cutting apparatus that includes a sled 2 having a generally cylindrical body 4 and runners 6. An extension arm 8 is extendable and retractable in a direction generally parallel to a longitudinal axis of the body 4. A cutting head 10 is attached to the extendable arm 8. The arm 8 may rotate relative to the body 4 or the cutting head 10 may rotate relative to the arm 8, or both. After a user positions a sled 2 generally in the vicinity of the lateral connection to which an opening must be cut, the extension and rotation may be used to bring the cutting head 10 into the specific location of cutting. Preferably the rotation and extension are driven by electric motors that may be manually controlled. In the alternative, the motors may be digitally controlled to move the cutter head through a programmed pattern as entered or programmed in a computer or other control device.

A remote sensing device 12, preferably a video camera with accompanying lights, is used in combination with the sled 2. Although the remote sensing device may be mounted upon the cutter sled 2, in the preferred embodiment, the video camera 12 is mounted on separate camera sled 16 to allow a less obstructed view of the cutting area and to allow placement of the sensor at a location that may minimize lens or light contamination by debris. Power and control communication means 18 may be employed to relay power and control signals to and from the cutter sled 2 and to supply power and relay control signals to and from the camera sled 16. Typically, these means include cables and/or conduits that may be run from the sled to a manhole above which control equipment and monitoring screens may be located, for example in a service vehicle. Control signals may be transmitted via wireless technology, RF signals, or other broadcast means, but the subterranean location of most applications makes a cable means or hard wire link preferable.

The preferred cutting medium is ultra-high pressured water, although other ultra-high pressured fluids may be employed. The preferred cutting head 10 is essentially a reinforced and/or resilient dual function nozzle that includes a cutting orifice 14, and a cleaning orifice 20. The cutting orifice 14 allows the release of a concentrated, high intensity stream of water and the cleaning orifice 20 throws a more disperse or less concentrated stream. A solenoid valve 40, preferably contained within the body of the sled 2, is supplied with the ultra-high pressure water. The solenoid valve 40 may be used to direct the ultra-high pressure water to the cutting orifice 14 or to the cleaning orifice 20. Although the valve is preferably located within the body of the sled, it may be located in the cutting head, extension arm, or other support structure element. Alternatively, the entire ultra-high pressure hydraulic system (or portions thereof) may be located on the exterior of the sled.

Because of the reaction force associated with the release of the ultra-high-pressured water, it is preferred to use a stabilizing or anchoring means 48. In FIG. 1, a hydraulic means 44 is shown to actuate a stabilizing anchor 48 for the sled 2, which anchor 48 may be pressed against the wall of the relined pipe. In the alternative, a separate motor, such as an electric motor, or a worm screw, or other driving means may be used to drive or actuate the anchoring means. A second preferred means 46 for actuating the anchor is the use of the force of the ultra-high pressure water. If the ultra-high pressured water is used as a driving means to lift the anchor from a resting position to a wall engagement position, then a valve means adapted to allow gradual opening or an anchor motion-retarding means is preferably employed to prevent a rapid or violent movement of the anchor 48 to the wall.

The cutting orifice 14 is directed towards the pipe liner surface that is to be cut and the combined action of the arm 8 and/or cutter head 10 rotation and/or extension allows a released stream of ultra-high pressured water to contact the liner at the desired point of cutting. The preferred mode for practicing the present invention includes the use of a spacing tube or collar 24, preferably a grooved Delrin™ tube or a brush that may be of any resilient material, but that is preferably formed of a stiff, synthetic material, and set screws 28 to ensure proper spacing of the cutting head 10 from the cutting surface. The tube 24 is positioned to extend from the cutting head 10 to the cutting surface and the concentrated stream of ultra high pressured water may be communicated therethrough. The tube 24 has perforations 50 therein to allow the release of discharged fluid from the cutting site in a relatively controlled manner and to decrease the splashing of water, debris, and resin. The tube 24 is preferably made of Delrin™ but may be any material that allows a desirable degree of sliding upon the liner surface. The tube 24 therefore minimizes the splashing of fluid and resin by surrounding the point of cutting and allowing fluid to exit through perforations. In addition, the tube 24 is preferably cut to match a curved face of the interior of the liner. If the tube is adapted for combination with a brush, or the tube comprises a brush that may match the curved face of the liner, then the brush is preferably adapted to match or to flexibly maintain contact with the liner.

The cleaning orifice 20 is directed towards the remote sensing equipment 12 such as a camera lens and lights. The water released through the cutting orifice 14 is released in a concentrated stream whereas the water released through the cleaning orifice 20 is in a less constricted stream and therefore more able to disperse into a water jet that is sufficiently diffuse to avoid substantial damage to the lens or light 12 that is cleaned.

The preferred remote sensing equipment 12 is a light source and camera. However, this preferred remote sensing or observation equipment is described herein by way of a preferred example and not by way of limitation. The light source is preferably a halogen bulb. The light and camera typically have a quartz cover-plate as a protective face plate that resists the entry of moisture. In addition, the camera preferably has a quartz lens that is adapted to prevent the migration of moisture into the camera. Camera and light sources and a variety of other remote sensing and observation equipment designed for the wet operations of sewer investigations are manufactured by many specialty sewer manufacturing companies and are known in the art in a variety of configurations and with a variety of features.

In the preferred embodiment having a lens and light source 12 on a separate sled 16, contamination may be minimized by using a programmed cutting pattern after a lateral opening site is located. In this manner, observation of actual cutting may be less critical and the lens may be turned away from the site during cutting to avoid resin contamination. The degree of diffusion required to dissipate the abrasive force of the ultra-high pressured water to a point where deposited resin may be cleared from the light source and camera, but where the light source and lens will not be substantially damaged, is about 10,000 p.s.i. or less. Of course the material composition of the surface to be cleaned (sensor, light, lens, etc.) may dictate a stronger or weaker stream to accomplish cleaning without damage. The difficulty of resin contamination removal is directly related to the degree to which the resin is allowed to cure. Preferably the cleaning orifice includes an insert that is a ruby, sapphire, diamond or other resilient mineral or other natural or engineered material. The cleaning orifice 20, will have a larger diameter opening 38 than the cutting orifice 14 (described below). Alternatively the orifice may be of a conical or other convenient configuration. Alternative pressures and diffuser or cleaning orifice insert designs may be used depending on the strength and configuration of the remote sensing equipment that is used. A retaining ring 42, set screw, or other retention means may be provided in the cleaning orifice 20.

The cutting head 10 also includes a cutting orifice 14 and cutting orifice insert 26 (preferably ruby, but optionally, sapphire, diamond or other material of similar hardness or other natural or engineered materials of sufficient hardness for use in applications involving ultra high pressure water). The cutting orifice insert 26 protects the body of the cutting head from the abrasive forces and destructive effects of the ultra-high pressure water which may abrade and degrade materials of lesser strength if it is attempted to pass such intensified or ultra-high pressured water through a small opening. The cutting orifice insert 26 is preferably held by set screws, a retaining ring, or other retention means 30.

Also included, preferably in the cutting head 10, is a dampening chamber 32 that comprises an enlarged chamber to dampen pulsations in the flow of the ultra-high pressured water.

Although propulsion means may be applied to the present invention to carry it through piping to a cutting location, a preferred mode of operation is simply to drag the sleds 2, 16 through the pipe in series as shown in FIG. 1. Of course, the sleds 2, 16 may be independently propelled or dragged if preferred. In addition to a drag line and power and communication lines 18, a length of ultra-high pressures hose 22 is provided. Preferably at least 600 feet of 50,000 psi working pressure hose is provided to the cutter sled 2. Although (depending on the application) higher pressures may be used, pressures beneath 50,000 psi are preferred for the purpose of cutting liners. It has been discovered that pressures below 50,000 psi result in minimal damage to the pipe while achieving sufficient and clean cutting of typical rehabilitative liners. Therefore, although particular applications may demand higher pressures, most applications of the present invention will use ultra-high pressured water in the range of about 20,000 psi to about 50,000 psi to cut liners. A range of 40,000 psi to 50,000 psi is presently preferred.

It is presently preferred to use a cutting orifice and cleaning orifice having generally circular openings and diameters of about 0.007 inch and about 0.020 inch respectively. Of course, depending on the intensifier that is used and the rate at which water is provided, different diameters may be appropriate. The presently preferred intensifier is a IP60-25FC/J produced by HYDRO-PAK, INC. Water from the intensifier at about 45,000 psi may generate a cutting stream from the about 0.007 inch diameter cutting orifice at a flow rate of approximately 0.205–0.229 gpm. Similarly, the approximately 0.020 diameter cleaning orifice releases the water at about 0.45–0.50 gpm. As will be understood by those of skill in the art of ultra-high pressure water applications, selection of orifice, pressures, and intensifiers may depend upon the particular application. Therefore, the present ranges and sizes are exemplary and presently preferred, but are not presented herein as limitations on the scope of the present invention.

Optionally a water or fluid source that is not intensified or "ultra-high-pressure" may be employed to clean the remote sensing equipment. In such an embodiment, the non-intensified fluid may be delivered to the sled through hoses not necessarily adapted to withstand the pressures of intensified fluids. If all water or fluid is delivered to the sled and intensification occurs at the sled, then a portion or a stream of the incoming fluid may be diverted for cleaning without intensification. Use of diffused intensified water is preferred for ease of configuration and for the cleaning ability that may be controlled through the degree of diffusion employed. Simply put, the intensified stream provides the option to remove partially cured resin and other debris that might not otherwise be removable without extraction of the sled to a manhole or other service point.

Having thus described the invention herein with reference to the preferred embodiments, it will be understood that the exemplary embodiment is provided by way of a preferred mode and is not intended to be limiting. For example, a wide variety of observation equipment may be employed and pressure ranges may vary depending on the resiliency of the material to be cut, the surface to be cleaned, or the particular adhesive qualities of the resin that comprises the liner. It will be further understood that the present invention is useful in many applications wherein cutting is performed in a confined space and wherein labor savings may be realized by cleaning observation equipment in-situ without repeated and laborious removal and insertion. The present invention is claimed as follows.

What is claimed is:

1. A method for cutting openings in an interior surface comprising the steps of:

placing in a confined space observation and cutting equipment said cutting equipment being adapted to cut an area on the interior surface;

locating the area to be cut on the surface within the confined space;

cutting said surface with said cutting equipment in the presence of the observation equipment;

cleaning said observation equipment while said observation equipment is in said confined space.

2. The method of claim 1 wherein:

a first stream of fluid is utilized to clean said observation equipment.

3. The method of claim 2 wherein:

the fluid of the first stream of fluid is water.

4. The method of claim 2 wherein:

the first stream of fluid is a diffused stream of ultra-high pressured water.

5. The method of claim 2 wherein:

the first stream of fluid is directed towards the observation equipment from the cutting equipment.

6. The method of claim 1 wherein:

the observation equipment is a video camera and light source.

7. The method of claim 1 wherein:
the cutting equipment cuts said surface with a second stream of fluid.

8. The method of claim 1 wherein:
the second stream of fluid is a stream of ultra-high pressured water.

9. The method of claim 1 wherein:
the cutting and observation equipment are contained on a single body.

10. The method of claim 1 wherein:
the cutting and observation equipment are contained on separate bodies.

11. A method for cutting service line openings in a pipe liner comprising the steps of:
   placing in a relined pipe observation and cutting equipment, said cutting equipment being adapted to cut a service line opening on the interior surface of the relined pipe;
   identifying with the observation equipment the location of a desired service line opening;
   cutting with the cutting equipment in the presence of the observation equipment a service line opening in the relined pipe at the location of the desired service line opening;
   cleaning said observation equipment while said observation equipment is in said relined pipe.

12. A mobile cutting system for cutting lateral openings in rehabilitative sewer pipe liners comprising:
   a first body;
   a cutting head being combined with and moveable about said body, said cutting head having a first opening formed therein,
   said first opening being in hydraulic communication with an ultra-high pressured water source; and
   the cutting head has a second opening formed therein, said second opening being in hydraulic communication with a cleaning fluid source, said second opening being larger than said first opening.

13. The mobile cutting system of claim 12 wherein:
the cleaning fluid source is the ultra-high pressured water source.

14. The mobile cutting system of claim 13 further comprising:
   a resilient protective insert located in the cutting head opening.

15. The mobile cutting system of claim 14 wherein:
the resilient insert is a member of the group consisting of ruby, sapphire, diamond and engineered materials.

16. The mobile cutting system of claim 15 further comprising:
   a remote sensing apparatus adapted to be positioned in viewing relationship with the cutting head.

17. The mobile cutting system of claim 16 wherein:
the remote sensing apparatus is mounted on the first body.

18. A mobile cutting system for cutting lateral openings in rehabilitative pipe liners comprising:
   a sled comprising:
   a body having a front end and a rear end,
   runners extending downwardly from the body,
   an actuatable anchor being combined with and extendable from the sled,
   a retractable arm having a first end and a second end, said first end being longitudinally extendible from the body,
   a cutting head mounted on said retractable arm first end;
   said cutting head comprising:
   a cutting head body having a cutting orifice formed therein and a having a cleaning orifice formed therein, said cutting orifice and cleaning orifice being in hydraulic communication with an ultra-high-pressure water source, and
   said cleaning orifice being larger than said cutting orifice; and
   a lens facing said cleaning orifice.

19. A mobile cutting and observation system for observing a selected area on an interior wall of a pipe liner, cutting an opening in said area, and cleaning away from at least a part of said system at least a part of debris caused by said cutting, said cutting and observation system comprising:
   an ultra-high pressure hose having a first end and a second end;
   a body having an ultra-high pressure hose connection thereon, said
   connection being combined with said ultra-high pressure hose first end;
   a body inflow conduit being in hydraulic communication with said ultra-high pressure hose connection;
   a valve being in hydraulic communication with said body inflow conduit said valve being actuatable in response to a valve control signal;
   a cutting stream conduit being in hydraulic communication with said valve;
   a cleaning stream conduit being in hydraulic communication with said valve;
   a head combined with said body, said head being rotatable and extendible relative to said body in response to a head control signal;
   said head having a cutting orifice formed therein;
   said cutting orifice being in hydraulic communication with a dampening chamber;
   said dampening chamber being in hydraulic communication with said cutting stream conduit;
   said head having a cleaning orifice formed therein;
   said cleaning orifice being in hydraulic communication with said cleaning stream conduit;
   a communication means combined with said valve for receiving valve control signals;
   a communication means combined with said head for receiving head control signals.

* * * * *